Figure 1:
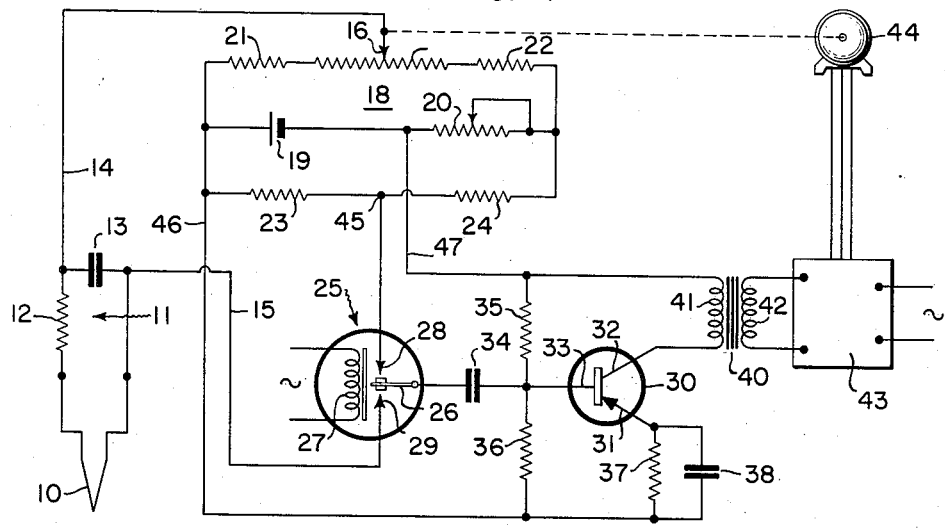

June 2, 1959

R. J. EHRET 2,889,517

ELECTRICAL MEASURING APPARATUS

Filed Feb. 15, 1954

INVENTOR.
ROBERT J. EHRET

BY Arthur H. Swanson

ATTORNEY.

United States Patent Office 2,889,517
Patented June 2, 1959

2,889,517

ELECTRICAL MEASURING APPARATUS

Robert J. Ehret, Philadelphia, Pa., assignor to Minneapolis-Honeywell Regulator Company, Minneapolis, Minn., a corporation of Delaware Application February 15, 1954, Serial No. 410,162

1 Claim. (Cl. 324—99)

A general object of the present invention is to provide a new and improved electrical measuring apparatus of the potentiometric type. More specifically, the present invention is concerned with electrical measuring apparatus using a direct current modulator with an associated amplifier which is arranged to minimize the introduction of undesirable stray signals in the apparatus and to provide a high level output signal.

Electrical potentiometric measuring devices are widely used in industry for purposes of measuring the magnitude of some particular input electrical signal. The most common form of these potentiometric devices is that form having a low level direct current input signal which is compared with a further direct current signal derived from a potentiometric network. The resultant low level signal is converted into an alternating current signal and is then applied to a suitable amplifier or other device which may be used to indicate the magnitude of the input signal. A representative potentiometric apparatus of a well known type will be found in the Walter P. Wills patent, 2,423,540, issued July 8, 1947. The Wills type apparatus is commonly referred to as a self-balancing potentiometric type of apparatus and the alternating current signal from the output of the converter or modulator is fed through an amplifier to a control motor with the motor in turn adjusting the rebalancing potentiometer to balance an input direct current signal.

Some applications of potentiometric type measuring devices involve the measurement of very low level currents and voltages. In such applications, it is desirable to have a high level of alternating current output signal from the modulator, with a minimum of interference due to noise or from extraneous sources. The solution of the problem by means of conventional amplifier devices has been unsatisfactory because of noise difficulties and the introduction of stray alternating signals into the input circuit and the consequent reduction of sensitivity and accuracy of the entire apparatus. In accordance with the present invention these difficulties of the prior art devices have largely been eliminated by employing an electronic amplifier of a type which is suitable for operation by the same low unidirectional voltage power supply that is employed to energize the potentiometric network.

It has been found that transistor amplifiers are particularly adapted to work from low voltage power supplies. However, these devices introduce additional problems in a normal amplification circuit because of their being highly temperature sensitive and being subject to other direct current variations and instabilities. As carried out by the present invention, these undesirable effects are eliminated to provide a useful universal potentiometric type of measuring apparatus.

It is accordingly a more specific object of the present invention to provide a new and improved electrical measuring apparatus of the potentiometric type employing a transistor amplifying circuit.

Another more specific object of the present invention is to provide a new and improved electrical measuring apparatus of the potentiometric type having a unidirectional voltage supply for a potentiometric network in the apparatus wherein that voltage supply is used to also supply energy for an amplifier associated therewith.

Still another more specific object of the present invention is to provide a new and improved electrical measuring apparatus using a potentiometric network having a unidirectional voltage supply therefor associated with a modulator with the modulator converting the signal upon the potentiometric network into an alternating current signal which is applied to an amplifier energized by the voltage supply for the potentiometric network.

A further object of the present invention is to provide an improved measuring apparatus of the potentiometric type having a potentiometric network powered by a unidirectional voltage supply with a converter for modulating a direct current signal from the network into an alternating current signal and with the output of the converter feeding a transistor amplifier which receives its energizing voltage from the power supply for the potentiometric network.

The various features of novelty which characterize this invention are pointed out with particularity in the claim annexed hereto and forming a part of this specification. For a better understanding of the invention, its advantages, and specific objects attained with its use, reference should be had to the accompanying drawings and descriptive matter in which there is illustrated and described a preferred embodiment of the invention.

Figure 2:
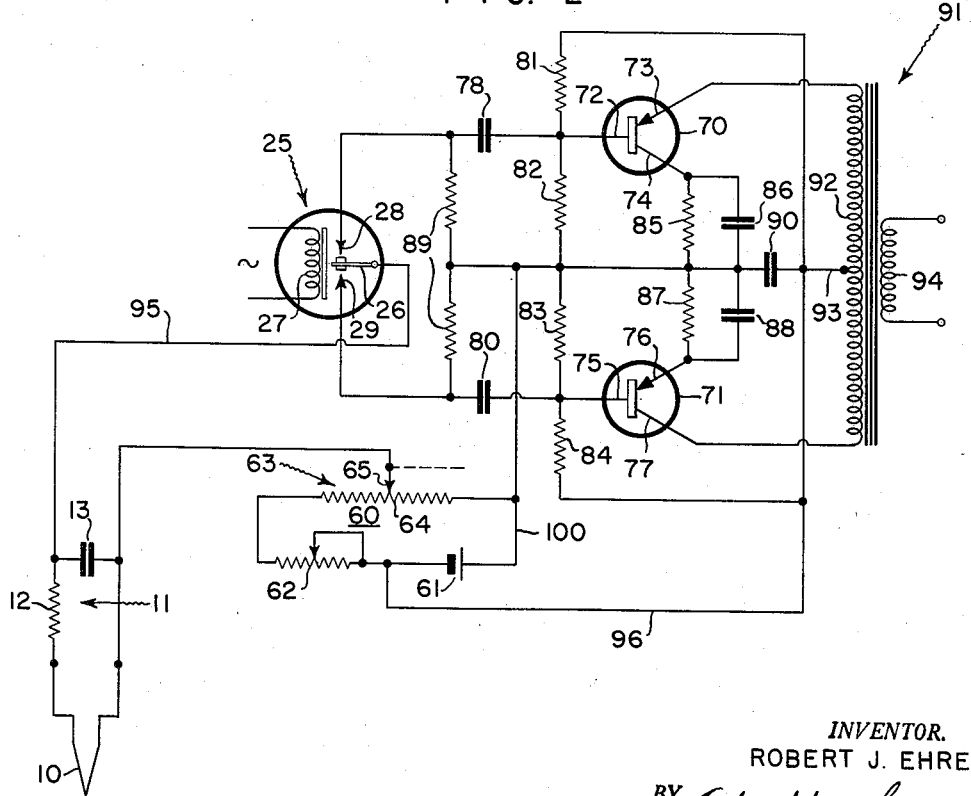

Of the drawings:

Fig. 1 is a schematic showing of one form of potentiometric measuring apparatus incorporating the present invention; and Fig. 2 shows a modified form of potentiometric measuring apparatus using a pair of transistor amplifiers.

Referring first to Fig. 1, the numeral 10 represents a thermocouple or other unidirectional signal producing device which may be exposed to a particular variable whose magnitude it is desired to measure. The output of this thermocouple is fed through a damping network 11 including a resistor 12 and a condenser 13. The output from the damping network 11 is by way of leads 14 and 15. The lead 14 is connected to a slider 16 movable over a potentiometer slidewire resistor 17. The slidewire resistor 17 is a part of a potentiometric network 18 which is energized by a direct or unidirectional voltage source 19 in the form of a battery. In series with the battery 19 is an adjustable resistor 20 which is used to adjust the magnitude of the voltage applied to the end terminals of the network 18. In series with potentiometer slidewire resistor 17 are a pair of resistors 21 and 22. Connected in the opposite side of the network are a further pair of resistors 23 and 24.

The lead 15 from the thermocouple 10 is connected to the input of a converter 25. This converter comprises a vibrating switch blade 26 which is driven in a vibrating manner by a driving coil 27, the latter being energized by a suitable alternating current signal. The vibrating blade 26 is alternately moved between the switch contacts 28 and 29.

Connected to the output of the converter or modulator 25 is a transistor 30 having an emitter electrode 31, a collector electrode 32, and a base electrode 33. The base electrode 33 is connected to the blade 26 of the converter 25 by way of a condenser 34. A pair of resistors 35 and 36 are used to establish the base electrode potential for the transistor 30. Connected in the emitter electrode circuit is a resistor 37 having a condenser 38 connected in parallel therewith, the resistor and condenser serving as an emitter biasing circuit for the transistor 30. In the output of the collector electrode circuit of the transistor 30 is a transformer 40 having a primary winding 41, and a secondary winding 42. The secondary winding feeds into the input of any suitable alternating current amplifier 43, such as shown in the above-mentioned Wills patent. This amplifier is of the type which is effective to be phase responsive to the input signal and produces an output controlling action which will drive a motor 44 in one direction or the other depending upon the input signal phasing. The motor 44 is in turn connected to drive the slider 16 over the associated slide-wire resistor 17.

In considering the operation of Fig. 1, it is first assumed that the apparatus shown is in a balanced position. In other words, tht direct current voltage originating from the thermocouple 10 is balanced by the unidirectional voltage appearing on the output of the potentiometric network 18. The circuit is so arranged that the voltage from the thermocouple 10 is added in series with the voltage from the network 18 and this series circuit may be traced from the lead 15 through the thermocouple 10, resistor 12, lead 14, slider 16, to the output terminal 45 of the network 18. Under balanced conditions, the contact 28, which is connected to the output terminal 45 will have the same potential thereon as the contact 29, the latter being connected to the lead 15. Thus, as the blade 26 vibrates between the contacts 28 and 29 there is produced no alternating current signal on the input of the transistor device 30.

The transistor 30 receives its energizing voltage from the battery 19 in the potentiometric network 18. The energizing circuit for the transistor may be traced from the positive terminal of the battery 19 through lead 46, resistor 37, emitter electrode 31, collector electrode 32, primary winding 41, and lead 47 back to the negative terminal of the battery 19. It will be noted that the resistors 35 and 36 are connected across the leads 46 and 47 with their junction being connected to the base electrode 33. This will establish a predetermined biasing potential on the base electrode 33 which is selected to be in the range of optimum operation for the particular transistor used. It will also be noted that the resistor 37 forms a further biasing means for the emitter electrode 31. The magnitude of this resistor is selected so that it will be relatively large compared to the resistance of the transistor device 30 between the emitter electrode 31 and collector electrode 32. The resistor 37 thus provides a biasing means for the emitter electrode 31 so that it will have an operating potential which is in the desired range for the particular transistor in use and also serves as a means for minimizing the effect of resistance changes of the transistor device 30 by making the transistor resistance changes appear small compared to the total resistance of the circuit.

When there is no input alternating current signal passed through the condenser 34, there will be no output signal flowing through the primary winding 41 and thus no input signal to the amplifier 43. Under these circumstances, there will be no motor drive signal for the motor 44 and the apparatus will remain in the position shown upon the drawing.

In the event that there should be an unbalance in the electrical circuit such that the output terminal 45 is positive in respect to the lead 15, there will be an alternating current signal produced by the converter 26 which will be readily apparent when it is noted that the blade 26 will be moved alternately between the contacts 28 and 29, which contacts are effectively positive and negative, respectively. This will produce an alternating current signal on the input of the transistor 30 and base electrode 33. As the base electrode 33 is swung in a negative direction there is a tendency for more current to flow between the emitter electrode 31 and the base electrode 33 which current flow is accompanied by a larger current flow between the emitter electrode 31 and the collector electrode 32. On the subsequent half cycle when the blade 26 is engaging contact 28, the base electrode will be swung in a positive direction and the current flow between the emitter 31 and the base electrode 33 will be decreased. The decrease in the emitter current flowing through the base electrode will result in a decrease in the output current flowing through the collector electrode circuit including the primary winding 41. Thus, an alternating current signal is applied to the input of the amplifier 43 and the phase of the signal will be such as to drive the motor 44 in a direction to reposition the slider 16 on the slidewire resistor 17 to balance the error signal.

If the polarity of the error signal should reverse from that assumed above, the operation will be essentially the same with the exception that the phasing of the alternating current signal will be 180° reversed from that first assumed. The effect of this will be to produce an output controlling action from the amplifier 43 which will drive the motor 44 in a direction opposite that assumed above until such time as the error signal applied to the converter 25 has been eliminated.

It will be readily apparent that the transistor 30 is being used to amplify only the alternating current originating from the converter or modulator 25. By eliminating the direct current variations of the transistor which occur due to its temperature sensitivity and other circuit instabilities, the direct current variations will have no effect on the resultant output signal. By powering the transistor by the power supply feeding the potentiometric network 18, there is a minimizing of the tendency for alternating current stray signals to be introduced into the apparatus which would tend to reduce its sensitivity. In this way, a high level alternating current signal is available from the basic potentiometric measuring circuit.

Referring now to Fig. 2, this figure represents a modified form of apparatus using the basic principles involved in Fig. 1. With this circuit, a center tapped output transformer may be used and the transistors of the apparatus hooked up to operate in a push pull manner to supply an output signal for the output transformer.

Considering Fig. 2 more specifically, the apparatus includes the basic thermocouple and damping circuits as Fig. 1 and these components carry corresponding reference characters. In addition, the modulator or converter is the same as that of Fig. 1 and likewise carries the same reference characters. The potentiometric network of Fig. 2 is identified by the numeral 60 and includes a battery 61, a variable resistor 62, and a potentiometer 63 having a slidewire resistor 64 and a movable slider 65.

In addition, Fig. 2 includes a pair of transistors 70 and 71. The transistor 70 includes a base electrode 72, a collector electrode 73, and an emitter electrode 74. The transistor 71 comprises a base electrode 75, an emitter electrode 76, and a collector electrode 77. Connected between the contact 28 of the vibrator 25 and the base electrode 72 is a condenser 78. Connected between the contact 29 of the vibrator converter 25 and the base electrode 75 is a further condenser 80. Connected to the base electrode 72 are a pair of resistors 81 and 82 which serve to establish the biasing potential for the base electrode 72. Connected to the base electrode 75 are a pair of resistors 83 and 84 and these resistors serve to establish the base potential for the transistor 71. In series with the emitter electrode 74 is a resistor 85 having a condenser 86 in parallel therewith. In series with the emitter 76 is a further resistor 87 having a condenser 88 in parallel therewith. A bypass condenser 90 is connected to the junction of the condensers 86 and 88. Resistors 89 are connected to condensers 78 and 80 to complete a direct current circuit thereareound.

The output of the transistors is by way of a transformer 91 having a primary winding 92 tapped at 93. A secondary winding 94 is adapted to be connected to an apparatus such as the amplifier 43 shown in Fig. 1.

In considering the operation of Fig. 2, it is first assumed that there is an electrical balance in the circuit. If there is an electrical balance, the voltage originating from the thermocouple 10 will be equal in magnitude, but opposite in polarity, to the voltage originating in the network 60. In other words, between the leads 95 and 100 there will be zero potential under the balanced condition.

With zero potential between the leads 95 and 100, there will be no input alternating current signal applied to the transistor devices 70 and 71. This will be for the reason that as the blade 26 vibrates back and forth between the contacts 28 and 29 there will be no electrical signal applied to either of the inputs of the transistors, which inputs are effectively between the base electrodes and lead 100.

While there is no input signal applied to the transistors 70 and 71, these transistors will be conducting a direct current which direct current is derived from the supply battery 61 of the network 60. The current flow circuit for the device 70 may be traced from the positive terminal of the battery 61 through lead 100, resistor 85, emitter electrode 74, collector electrode 73, the upper half of secondary 92, and lead 96 back to the negative terminal of the source 61. The current flow circuit for the transistor 71 may be traced from the positive terminal of the battery 61 through lead 100, resistor 87, emitter electrode 76, collector electrode 77, the lower section of secondary 92, and lead 96 back to the negative terminal of the battery 61. The magnitude of the current flow will be dependent upon the magnitudes of the resistors 81 and 82 in their establishing a biasing voltage on the base electrode 72 and the magnitude of the resistors 83 and 84 establishing a base biasing potential for the transistor 71. In addition, the curent flowing through the emitter electrode resistors 85 and 87 serves to bias the respective transistors 70 and 71 into the desired operating range as well as provide a means for minimizing the resistance changes of the transistors 70 and 71.

When there is no input error signal applied to the transistors 70 and 71 by the converter 25 there will be no change in their output currents so that there will be no resultant change in the voltage produced in the secondary winding 94. However, if there is an unbalance signal there will be applied to the input of the respective transistors 70 and 71 an input signal. The input signal being first assumed to be positive on lead 95 relative to lead 100. The input circuit is between the base electrodes and the respective emitter electrodes so that when the blade 26 engages the contacts 28 or 29, the respective base electrodes 72 and 75 will be made alternately positive. This will cause the transistor 70 to first conduct a smaller amount of current through the collector electrode circuit and then the transistor 71 to conduct a smaller amount of current in the subsequent half cycle. There will thus appear in the primary winding 92 a series of direct current pulses of opposite polarity which in the output winding 94 will appear as an alternating signal.

If the unbalance had been in the opposite direction so that the blade 26 is effectively negative, the respective base electrodes 72 and 75 will be alternately driven in a negative direction and there will be a resultant increase in the current flows through the respective transistors. This will produce a further series of direct current pulses of opposite polarity flowing through the secondary winding 92 and a resultant alternating current in the secondary 94. The output signal will now be an alternating current signal of reversed polarity from the first assumed error signal.

As with Fig. 1, the apparatus of Fig. 2 may be arranged so that the output signal from the transformer 91 is fed through an amplifier and motor combination to rebalance the slider 65 until there is no longer an input error signal to the converter or modulator 25.

The circuit of Fig. 2 incorporates all of the advantages of Fig. 1 and provides the additional advantage of a push-pull output for a larger signal handling capacity. It should be noted that this figure also takes advantage of the alternating current translating characteristics of the transistors while minimizing the effect of direct current variations due to temperature and other effects. The supplying of the energizing potential for the transistors 70 and 71 from the potentiometer supply battery 61 further enhances the apparatus, for the reasons enumerated above for Fig. 1.

While, in accordance with the provisions of the statutes, there has been illustrated and described the best forms of the embodiments of the invention known, it will be apparent to those skilled in the art that changes may be made in the form of the apparatus disclosed without departing from the spirit of the invention as set forth in the appended claim and that in certain cases, certain features of the invention may be used to advantage without a corresponding use of other features.

Having now described my invention what I claim as new and desire to secure by Letters Patent is:

Electrical apparatus for measuring very low level signals and producing a high level output signal and including means for obviating disturbing effects from stray noise signals, said apparatus comprising, in combination, a measuring circuit including a pair of input terminals for connection to a source of unidirectional voltage signals to be measured, an adjustable electrical network including a unidirectional voltage supply, said network having an output voltage connected to be compared with the voltage on said pair of input terminals, a signal converter for converting unidirectional voltage signals into alternating signals, said converter having output and input means, means connecting one terminal of said pair of terminals and said adjustable network to the input of said converter, a transistor having a base electrode, emitter electrode and collector electrode, biasing voltage connecting means to said collector, emitter, and base electrodes from said unidirectional voltage supply, means connecting the output means of said converter to the input of said transistor, said transistor input including said base electrode, and an output circuit means included in the connection of said collector electrode to said unidirectional voltage supply.

References Cited in the file of this patent

UNITED STATES PATENTS

| | | |
|---|---|---|
| 2,421,560 | Haynes | June 3, 1947 |
| 2,487,010 | Wild | Nov. 1, 1949 |
| 2,508,424 | Rouy | May 23, 1950 |
| 2,586,686 | Medlock | Feb. 19, 1952 |
| 2,609,459 | Bergson | Sept. 2, 1952 |
| 2,653,282 | Darling | Sept. 22, 1953 |
| 2,761,916 | Barton | Sept. 4, 1956 |

OTHER REFERENCES

Article published in Radio and Television News, January 1956, page 87. (Copies available in Scientific Library and 179-171-MB.)